(12) United States Patent
Tamagawa

(10) Patent No.: US 7,102,785 B2
(45) Date of Patent: Sep. 5, 2006

(54) PROFILE PRODUCING METHOD AND PROFILE PRODUCING APPARATUS

(75) Inventor: Kiyomi Tamagawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 949 days.

(21) Appl. No.: 09/758,434

(22) Filed: Jan. 12, 2001

(65) Prior Publication Data

US 2001/0030777 A1    Oct. 18, 2001

(30) Foreign Application Priority Data

Jan. 13, 2000    (JP)    ............................. 2000-009996

(51) Int. Cl.
 *G06F 15/00*    (2006.01)
 *G06F 3/08*    (2006.01)
 *G06K 15/00*    (2006.01)

(52) U.S. Cl. ...................... 358/1.9; 358/523; 358/3.27

(58) Field of Classification Search ................ 358/1.9, 358/532, 518, 529, 3.01, 520, 525, 523, 3.27; 355/38; 345/611; 382/264
See application file for complete search history.

(56) References Cited

U.S. PATENT DOCUMENTS

| | | | | |
|---|---|---|---|---|
| 4,929,978 A | * | 5/1990 | Kanamori et al. | ............ 355/38 |
| 4,941,038 A | * | 7/1990 | Walowit | ..................... 358/518 |
| 5,283,671 A | * | 2/1994 | Stewart et al. | ............. 358/532 |
| 5,331,440 A | * | 7/1994 | Kita et al. | ................... 358/529 |
| 5,469,275 A | * | 11/1995 | Edgar | ........................ 358/3.01 |
| 5,489,921 A | * | 2/1996 | Dorff et al. | ................. 345/604 |
| 5,500,921 A | * | 3/1996 | Ruetz | ......................... 358/1.9 |
| 5,557,712 A | * | 9/1996 | Guay | ........................ 345/611 |
| 5,699,491 A | * | 12/1997 | Barzel | ........................ 358/1.9 |
| 6,072,589 A | * | 6/2000 | Rozzi | ......................... 358/1.9 |
| 6,198,552 B1 | * | 3/2001 | Nagae | ........................ 358/518 |
| 6,301,025 B1 | * | 10/2001 | DeLean | ..................... 358/518 |
| 6,381,037 B1 | * | 4/2002 | Balasubramanian et al. | .......................... 358/3.23 |
| 6,697,519 B1 | * | 2/2004 | Rao | ........................... 382/162 |
| 6,888,961 B1 | * | 5/2005 | Tamagawa et al. | ......... 382/162 |

* cited by examiner

*Primary Examiner*—Madeleine A V Nguyen
(74) *Attorney, Agent, or Firm*—Sughrue Mion, PLLC

(57) ABSTRACT

There are disclosed a profile producing method and a profile producing apparatus for producing a profile in a device for mediating between image data including color data and a color image, such as a color scanner and a color printer. In the process of producing the profile, a smoothing processing is applied.

4 Claims, 13 Drawing Sheets

|   | C | M | Y | K | X | Y | Z |
|---|---|---|---|---|---|---|---|
| (A) | 0 | 0 | 0 | 0 | 72.34 | 74.35 | 71.21 |
|   | 40 | 40 | 40 | 0 | 48.32 | 49.69 | 45.32 |
|   | 70 | 70 | 70 | 0 | 28.94 | 29.87 | 24.39 |

|   | C | M | Y | K | X | Y | Z |
|---|---|---|---|---|---|---|---|
| (B) | 0 | 0 | 0 | 0 | 72.34 | 74.35 | 71.21 |
|   | 10 | 10 | 10 | 0 | 68.82 | 70.11 | 66.64 |
|   | 20 | 20 | 20 | 0 | 61.67 | 63.64 | 59.54 |
|   | 30 | 30 | 30 | 0 | 56.72 | 55.37 | 52.36 |
|   | 40 | 40 | 40 | 0 | 48.32 | 49.69 | 45.32 |
|   | 50 | 50 | 50 | 0 | 42.64 | 43.54 | 40.54 |
|   | 60 | 60 | 60 | 0 | 35.63 | 36.64 | 34.42 |
|   | 70 | 70 | 70 | 0 | 28.94 | 29.87 | 24.39 |

PROFILE PRODUCING METHOD AND PROFILE PRODUCING APPARATUS

BACKGROUND OF THE INVENTION

1. Field of the Invention

The present invention relates to a profile producing method and a profile producing apparatus for producing a profile representative of the association between color data representative of values of for example red (R), green (G) and blue (B), or color data representative of dot % of cyan (C), magenta (Y) and black (K), and colors on a color image associated with image data including the color data, in a device for mediating between image data including color data and a color image, such as a color scanner and a color printer.

2. Description of the Related Art

Hitherto, it is performed that image data is obtained through reading a recorded original image by a color scanner and the like, and an image is outputted by a color printer in accordance with the image data thus obtained, so that an image, which is very closely similar in a color to the original image, is obtained, and an image, which is very closely similar in a color to an image obtained by printing based on the image data obtained by the color scanner, is outputted by a color printer. To perform a color matching for providing matching of colors of two images, there is used a profile defining the association between color data representative of dot % of CMYK for example, of an output device such as a color printer, and colors outputted in accordance with the color data, so that an image represented by a desired color can be obtained by a conversion of the image data using the profile. Here, the conversion as to colors is noticed. Hereinafter, such a conversion is referred to as a color conversion.

To make up such a profile, a color chart, consisting of sets of color patches associated with a plurality of sorts of color data wherein with respect to four colors of CMYK for example, dot % is sequentially varied as 0%, 40%, 70%, 100%, is outputted by an output device such as a color printer, and the color patches of the color chart thus outputted are measured by a calorimeter to obtain XYZ values defined by XYZ color system or L*a*b* values defined by CIELAB, so that color data of CMYK are associated with the XYZ values (or the L* a*b* values). Hereinafter, it is defined that the XYZ are values defined by the XYZ color system, and the L*a*b* are values defined by the CIELAB.

Basically, the profile is produced in the manner as mentioned above. However, the number of color patches constituting the color chart is not so large number that the number of color patches corresponds to that of the profile on a basis of one-to-one. Accordingly, it is performed to increase the number of pairs of the association between CMYK data and XYZ data (or L*a*b* data) by the interpolation operation and the like in accordance with a color association definition (here, the finally completed one is referred to as a "profile", and the non-completed one is referred to as a "color association definition") defining the association between CMYK data and XYZ data (or L a b data), which are obtained by a colorimetry of the color chart in the manner as mentioned above, and finally a desired profile is produced.

In the event that it is intended to obtain an output image by a color printer in accordance with image data obtained by a color scanner, color data included in the image data is modified using the profile produced in the manner as mentioned above, but not using the image data obtained by the color scanner, so that a desired color of image is outputted in accordance with the modified color data.

By the way, according to the above-mentioned method of producing a profile, it happens that the produced profile may include noises destroying monotonicity of variations of XYZ data or L*a*b* data to variations of color data of any of C, M, Y, K owing to measurement errors by a calorimeter, and characteristics of a device of an object of the profile to be produced, for example, characteristics of a color printer outputting of the color chart (for example, in some characteristics of the color printer, even if a color patch based on the same color data is concerned, it happens that colors of color patches are mutually different between a case where the color patch is recorded on the center of a paper and a case where the color patch is recorded on the edge of the paper). In the event that the produced profile includes such a noise, when the color conversion is performed using the profile, a jump in color density and a fluctuation in a hue direction will occur on a portion of gradation wherein density of a color is continuously varied, in a color image outputted based on image data after the color conversion, and thus there is a possibility that it is difficult to output a color image having an image quality which is high in color. Further, in the event that an inversion profile, wherein CMYK data is determined from XYZ data (or L*a*b* data) in accordance with the produced profile, is determined by a computation, there is a possibility that noises included in the profile become a main cause of errors of the computation, so that it is difficult to exactly determine the inversion profile.

SUMMARY OF THE INVENTION

In view of the foregoing, it is an object of the present invention to provide a profile with great accuracy in which the noises as mentioned above are removed.

To achieve the above-mentioned object, the present invention provides a profile producing method of producing a profile representative of an association between a first color data representative of coordinates on a device-dependence color space dependent on a device mediating between image data including color data and a color image, and a second color data representative of coordinates on a common color space independent of devices, said profile producing method comprising:

a color association definition obtaining step of obtaining a color association definition defining an association between the first color data representative of coordinates on the device-dependence color space and the second color data representative of coordinates on the common color space; and a profile producing step of producing a profile defining an association between the first color data representative of coordinates on the device-dependence color space and smoothed second color data representative of coordinates on the common color space, in accordance with the color association definition obtained in said color association definition obtaining step, via a smoothing step of smoothing the second color data representative of coordinates on the common color space to the first color data representative of coordinates on the device-dependence color space.

Here, the device-dependence color space implies for example a color space defined by CMYK four colors in a case where the device is an output device outputting an image in accordance with color data of CMYK four colors, or a color space defined by RGB three colors in a case where the device is an input device obtaining color data of RGB three colors from the device. On the other hand, the common color space independent of devices implies a color space defined by for example XYZ independent of a specified device, or a color space defined by L*a*b*.

The profile producing method of the present invention comprises the color association definition obtaining step and the profile producing step. The profile producing step has the smoothing step. The profile producing step produces a profile defining an association between the first color data representative of coordinates on the device-dependence color space and smoothed second color data representative of coordinates on the common color space, in accordance with the color association definition obtained in said color association definition obtaining step, via the smoothing step. This feature makes it possible to produce a profile with great accuracy suppressing noises.

In the profile producing method according to the present invention as mentioned above, it is acceptable that said color association definition obtaining step comprises:

a color chart producing step of causing an output device to output a color chart composed of a plurality of color patches associated with a plurality of first color data; and a color chart colorimetry step of measuring a plurality of color patches constituting the color chart obtained in said color chart producing step to determine the second color data for the color patches, wherein the color association definition is obtained through said color chart producing step and said color chart colorimetry step.

Further, in the profile producing method according to the present invention as mentioned above, it is acceptable that said profile producing step comprises:

a smoothing step of smoothing the second color data to the first color data using the first color data and the second color data constituting the color association definition obtained in said color association definition obtaining step to determine a new color association definition defining an association between the first color data and smoothed second color data; and a profile construction step of constructing a profile in accordance with the new color association definition obtained in said smoothing step, the profile consisting of pairs of the first color data and the second color data mutually associated, which are more than the number of pairs of the mutually associated first color data and the smoothed second color data, constituting the new color association definition.

Or alternatively, it is acceptable that said profile producing step comprises:

a color association definition reconstruction step of producing a new color association definition in accordance with the color association definition obtained in said color association definition obtaining step, said new color association definition consisting of pairs of the first color data and the second color data, which are more than the number of pairs of the mutually associated first color data and the second color data, constituting the color association definition, and which are equal in number to pairs of the mutually associated first color data and the second color data, constituting the finally produced profile; and a smoothing step of smoothing the second color data to the first color data using the first color data and the second color data constituting the color association definition obtained in said color association definition obtaining step, whereby said profile producing step produces a profile defining an association between the first color data and smoothed second color data.

Inclusion of such a large number of color patches that it meets an amount of data finally necessary as a profile into the color chart makes it difficult to do works such as colorimetry and the like. It is usual that an amount of data for a color association definition produced through a colorimetry of the color chart is extremely less as compared with an amount of data for the profile. In this case, it is acceptable that as mentioned above, the smoothing is performed at the stage of the color association definition which is less in an amount of data, and thereafter an amount of data is increased by the interpolation operation for example, or alternatively an amount of data is increased from the color association definition which is less in an amount of data to an amount of data same as an amount of data for a profile finally produced, and thereafter the smoothing is performed.

Further in the profile producing method according to the present invention as mentioned above, it is acceptable that said color association definition obtaining step is a step of obtaining a color association definition consisting of pairs of the first color data and the second color data, which are equal in number to pairs of the mutually associated first color data and the second color data, constituting the finally produced profile; and said profile producing step is a step of producing a profile defining an association between the first color data and smoothed second color data via a smoothing step of smoothing the second color data to the first color data using the first color data and the second color data constituting the color association definition obtained in said color association definition obtaining step.

It is acceptable that for example in the event that there exists a profile already produced as to the device of interest, the existing profile is obtained and is subjected to the smoothing and thereby reducing noises destroying monotonicity.

In the above-mentioned profile producing method, it is acceptable that said smoothing step is a step of performing a smoothing on a partial area on a color space. In this case, it is preferable that said smoothing step is a step of performing a smoothing on a high density area on a color space.

To achieve the above-mentioned object, the present invention provides a profile producing apparatus for producing a profile representative of an association between a first color data representative of coordinates on a device-dependence color space dependent on a device mediating between image data including color data and a color image, and a second color data representative of coordinates on a common color space independent of devices, said profile producing apparatus comprising:

a color association definition obtaining section for obtaining a color association definition defining an association between the first color data representative of coordinates on the device-dependence color space and the second color data representative of coordinates on the common color space; and a profile producing section for producing a profile defining an association between the first color data representative of coordinates on the device-dependence color space and smoothed second color data representative of coordinates on the common color space, in accordance with the color association definition obtained in said color association definition obtaining section, said profile producing section including a smoothing processing section for smoothing the second color data representative of coordinates on the common color space to the first color data representative of coordinates on the device-dependence color space.

In the profile producing apparatus according to the present invention as mentioned above, it is acceptable that said smoothing processing section receives the color association definition obtained in said color association definition obtaining section, and smoothes the second color data constituting the color association definition to the first color data constituting the color association definition to produce a new color association definition defining an association between the first color data and smoothed second color data, and said profile producing section further comprises in addition to said smoothing processing section a profile construction section for constructing a profile in accordance with the new color association definition obtained in said smoothing processing section, the profile consisting of pairs of the first color data and the second color data mutually associated, which are more than the number of pairs of the mutually associated first color data and the smoothed second color data, constituting the new color association definition.

Or alternatively it is acceptable that said profile producing section comprises a color association definition reconstruction section for producing a new color association definition in accordance with the color association definition obtained in said color association definition obtaining section, said new color association definition consisting of pairs of the first color data and the second color data, which are more than the number of pairs of the mutually associated first color data and the second color data, constituting the color association definition, and which are equal in number to pairs of the mutually associated first color data and the second color data, constituting the finally produced profile, and wherein said smoothing processing section receives the new color association definition obtained in said color association definition obtaining section, and smoothes the second color data constituting the new color association definition to the first color data constituting the new color association definition obtained in said color association definition obtaining section, thereby producing a profile defining an association between the first color data and smoothed second color data.

Further alternatively it is acceptable that said color association definition obtaining section obtains a color association definition consisting of pairs of the first color data and the second color data, which are equal in number to pairs of the mutually associated first color data and the second color data, constituting the finally produced profile, and said profile producing section produces a profile defining an association between the first color data and smoothed second color data in such a manner that the color association definition obtained in said color association definition obtaining section is fed to said smoothing processing section to smooth the second color data constituting the color association definition to the first color data constituting the color association definition obtained.

In the profile producing apparatus as mentioned above, it is acceptable that said smoothing processing section performs a smoothing on a partial area on a color space. In this case, it is preferable that said smoothing processing section performs a smoothing on a high density area on a color space.

Further, in the profile producing apparatus according to the present invention as mentioned above, it is acceptable that said profile producing apparatus further comprises a handler for designating an area to be subjected to the smoothing processing, and said smoothing processing section performs a smoothing on an area designated in accordance with an operation of said handler. And it is also acceptable that said profile producing apparatus further comprises an area display section for displaying an area for which a smoothing processing is necessary.

An application of the smoothing processing through communication with an operator makes it possible to perform a fine processing excellent in operability and satisfied by the operator.

DETAILED DESCRIPTION OF PREFERRED EMBODIMENTS

Embodiments of the present invention will be described with reference to the accompanying drawings.

Figure 1:
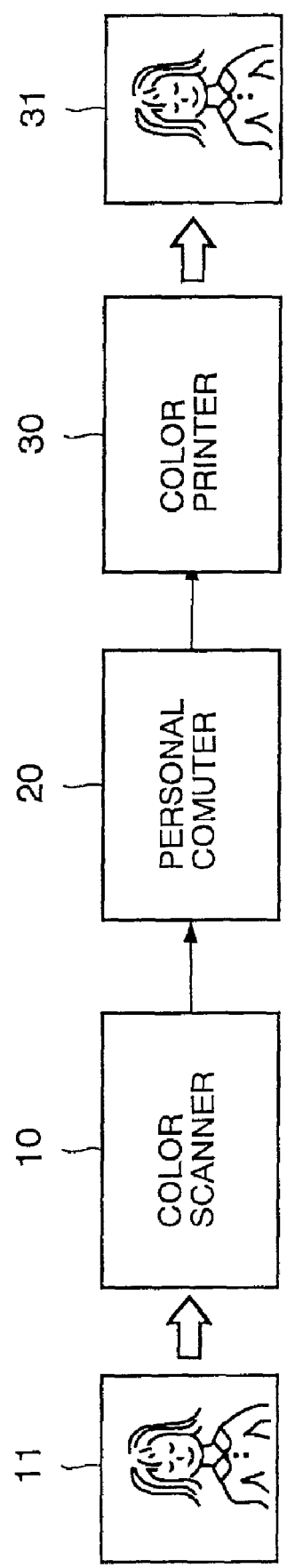
FIG. 1 is a schematic constitution view of an image input-color conversion-image output system.

FIG. 1 is a schematic constitution view of an image input-color conversion-image output system.

A color scanner 10 reads an original image 11 and produces image data of RGB three colors. The image data of the RGB three colors is fed to a personal computer 20. The personal computer 20 converts the image data obtained by the color scanner 10 into image data of CMYK four colors for an image output suitable for a color printer 30 which will be described later. The image data for the image output is fed to the color printer 30. The color printer 30 performs a print output in accordance with the entered image data so that a print image 31 is formed.

The personal computer 20 serves as an embodiment of a profile producing apparatus of the present embodiment, and produces a profile beforehand. When the image data obtained by the color scanner 10 is converted into the image data for the color printer 30, the profile thus produced is referred to. The profile and a method of producing the profile will be described later.

In the system shown in FIG. 1, while the color scanner for reading an original image to produce image data is shown as an example of an input device for receiving an image to obtain image data, any one is acceptable, as the input device, which is a system in which for example, an image is recorded on a reversal film by a digital still camera (DSC) and a photography using the reversal film, and the recorded image is read by a color scanner to derive image data, or alternatively one in which an image is received to derive image data.

Further, in the system shown in FIG. 1, while the color printer 30 is shown as an example of an output device for outputting an image based on the image data, any one is acceptable, as the output device, which is a color printer according to an electrophotographic scheme, a color printer according to an ink jet scheme, or a printer according to a system in which a printing paper is exposed with a modulated laser beam and the exposed printing paper is developed, and it doesn't matter as to the printing scheme and the printing system. Further, as the output device, it is not restricted to a printer, and any one is acceptable which is a printing machine, or alternatively an image display device such as a CRT display unit for displaying an image on a display screen, and a plasma display unit.

Here, however, there will be described a system having the color scanner 10 and the color printer 30 by way on examples of the input device and the output device, respectively.

An aspect as an embodiment of the present invention in the system shown in FIG. 1 resides in processing contents to be executed inside the personal computer 20. Hereinafter, there will be described the personal computer 20.

Figure 2:
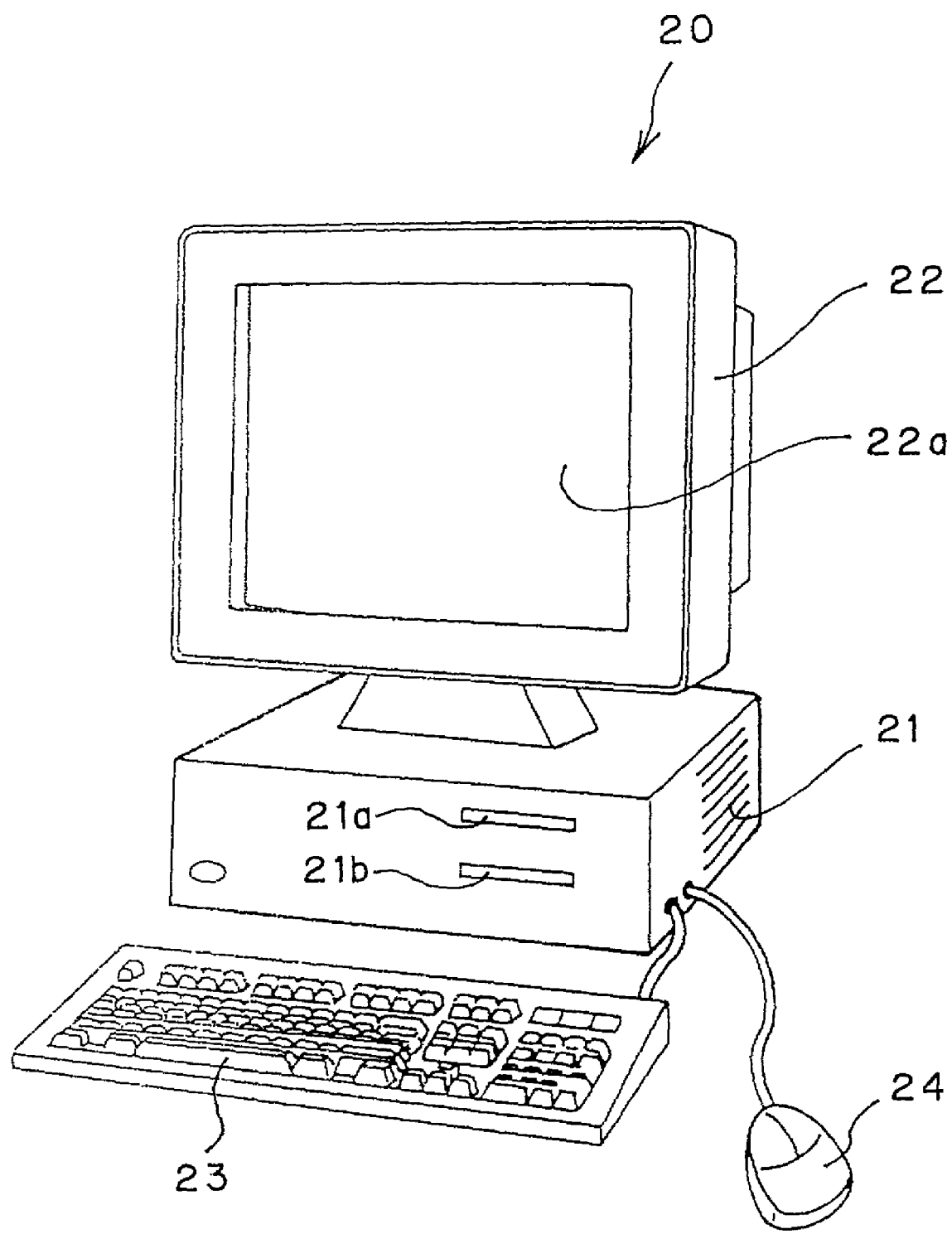
FIG. 2 is a perspective view of a personal computer shown in FIG. 1.
Figure 3:
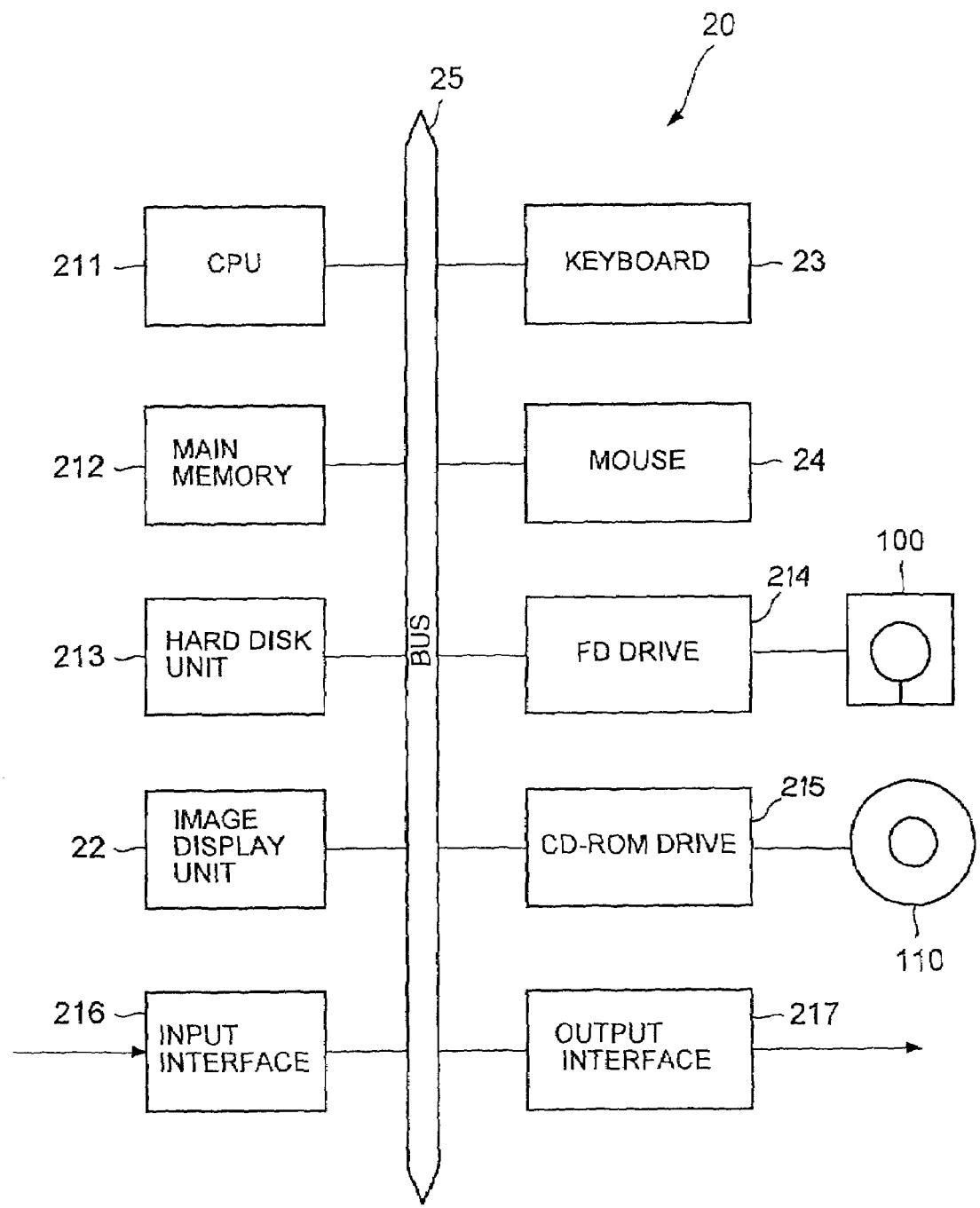
FIG. 3 is a hardware structural view of the personal computer.

FIG. 2 is a perspective view of the personal computer 20 shown in FIG. 1. FIG. 3 is a hardware structural view of the personal computer 20.

The personal computer 20 comprises, on an external appearance, a main frame unit 21, an image display unit 22 for displaying an image on a display screen 22a in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22a, the icon and the like being displayed on the position on the display screen 22a. The main frame unit 21 has a floppy disk mounting slot 21a for mounting a floppy disk, and a CD-ROM mounting slot 21b for mounting a CD-ROM.

The main frame unit 21 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, an FD drive 214 for accessing a floppy disk 100 mounted thereon, a CD-ROM drive 215 for accessing a CD-ROM 110 mounted thereon, an input interface 216 connected to the color scanner 10 (cf. FIG. 1), to receive image data from the color scanner 10, and an output interface 217 connected to the color printer 30 (cf. FIG. 1) to transmit image data to the color printer 30. These various types of elements are connected via a bus 25 to the image display unit 22, the keyboard 23 and the mouse 24.

The CD-ROM 110 stores therein a program for causing the personal computer 20 to operate as a profile producing apparatus. The CD-ROM 110 is mounted on the CD-ROM drive 215 so that the program, which is stored in the CD-ROM 110, is up-loaded on the personal computer 20 and is stored in the hard disk unit 213.

Next, there will be described a method of producing a profile.

Figure 4:
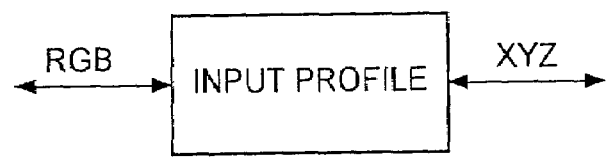
FIG. 4 is a conceptual view of an input profile.

FIG. 4 is a conceptual view of an input profile.

When the input profile is available from a maker and the like of the color scanner 10, it is unnecessary to newly produce the input profile. Here, there will be described a fundamental producing method of the input profile.

A color chart composed of a large number of color patches, instead of the original image 11 shown in FIG. 1, is prepared, and an image of the color chart is read by the color scanner 10 to obtain a first color data for each color patch on an RGB space (an example of the device-dependence color space referred to in the present invention), while the original image is measured by a calorimeter to obtain a second color data for each color patch, representative of coordinate points on an XYZ space which is an example of a common color space. A detailed explanation of the common color space will be described later.

In this manner, there is obtained a color association definition defining the association between a coordinate point on the RGB color space and a coordinate point on the XYZ color space. This color association definition depends on an input device, varying in accordance with a sort of the color scanner 10, and generally in accordance with a sort of the input device.

The color association definition thus obtained simply defines the association between the RGB color data and the XYZ data as to the coordinate points at extremely rough intervals on the RGB color space, since there is a limit in the number of color patches constituting the color chart. For this reason, after the color association definition is obtained, the interpolation operation and the like are applied to the color association definition to produce an input profile defining the association as to the coordinate points at desired fine intervals on the RGB color space. The input profile thus produced depends on the input device, since the associated color association definition depends on the input device.

An application of a smoothing processing in the process of producing the input profile in accordance with the color association definition makes it possible to produce an input profile with great accuracy in which noises are reduced. The smoothing processing will be described later in conjunction with an output profile which will be described hereinafter.

Figure 5:
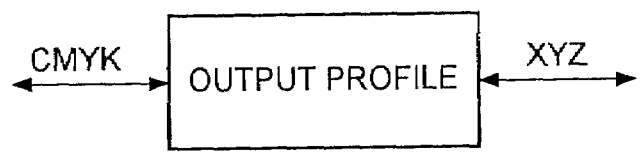
FIG. 5 is a conceptual view of an output profile.

FIG. 5 is a conceptual view of an output profile.

The personal computer 20 shown in FIG. 1 generates color data, as color data of CMYK four colors, in which values of C, M, Y, K are sequentially varied, and prints and outputs the color chart based on the color data thus generated. The printed image 31 shown in FIG. 1 is not representative of the color chart. It is assumed, however, that the color chart is printed out instead of the printed image 31, and the color patches constituting the color chart are measured by a calorimeter. In this manner, there is produced a color association definition representative of the association between a coordinate value on the color space of CMYK four colors (this also corresponds to an example of the device-dependence color space referred to in the present invention) and a coordinate value on the common color space (here XYZ color space). This color association definition depends on an output device, varying in accordance with a sort of the output device.

The color association definition thus obtained simply defines the association between the CMYK color data and the XYZ data as to the coordinate points at extremely rough intervals on the CMYK color space, since there is a limit in the number of color patches constituting the color chart, in a similar fashion to that of producing the input profile. For this reason, after the color association definition is obtained, the interpolation operation is applied to the color association definition to produce an output profile defining the association as to the coordinate points at desired fine intervals on the CMYK color space. In the process of producing the output profile in accordance with the color association definition, a smoothing processing as well as the interpolation operation are carried out, and thus it is possible to produce an output profile with great accuracy in which noises disturbing are removed.

Figure 6:
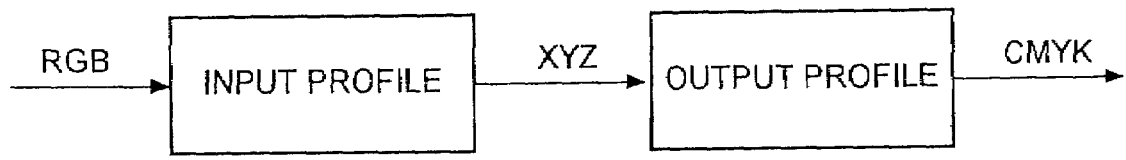
FIG. 6 is a conceptual view of a color conversion definition consisting of an input profile and an output profile.

FIG. 6 is a conceptual view of a color conversion definition consisting of an input profile and an output profile.

The input profile and the output profile, which are explained referring to FIGS. 4 and 5, respectively, are stored in the personal computer 20 shown in FIG. 1. The image data of RGB obtained by the color scanner 10 is converted, as shown in FIG. 6, temporarily into image data on the XYZ space by the input profile, and the image data on the XYZ space is converted into the image data of CMYK by the output profile and then transferred to a color printer. Thus, the color printer 30 can obtain the printed image 31 in which a color representation of the original image 11 is reproduced.

Here, there will be described the common color space. With respect to the common color space, while it is explained in the above that the XYZ color space is an example of the common color space, there is no need that the common color space is the XYZ color space. Any one is acceptable, as the common color space, which is defined in such a manner that it is independent of a specified input device or a specified output device. For example, it is acceptable that the common color space is L*a*b* color spaces, or alternatively it is acceptable that the common color space is a coordinate system clearly defined in such a manner that coordinate points on the color spaces are associated with the color spaces one by one. As an example of such a coordinate system, there is a standard RGB signal defined as follows.

$$\begin{bmatrix} R_{sRGB} \\ G_{sRGB} \\ B_{sRGB} \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix}$$

Assuming that $R_{8bit}$ denotes one wherein $R_{SRGB}$ is expressed by 8 bits, the following expression is given.

$$R_{8bit} = 255 \times 12.92 R_{SRGB} \quad (0 < R_{SRGB} < 0.00304)$$

$$R_{8bit} = 255 \times 1.055 R_{SRGB}^{(1.0/2.4)} - 0.055$$

$$(0.00.04 \leq R_{SRGB} \leq 1)$$

Also as to $G_{8bit}$ and $B_{8bit}$ wherein $G_{SRGB}$ and $B_{SRGB}$ are expressed by 8 bits, respectively, similarly, $G_{8bit}$ and $B_{8bit}$ can be converted from $G_{SRGB}$ and $B_{SRGB}$, respectively.

Alternatively, it is acceptable that a color space defined by cmy density of a reversal film is adopted as the common color space. A definition of the common color space makes it possible to clearly define a color representation area in the common color space.

In the above, there has been explained a basic method of producing the input profile and the output profile. Hereinafter, there will be described various embodiments of a profile producing method of the present invention, taking by way of example a method of producing the output profile.

Figures 7, 8:
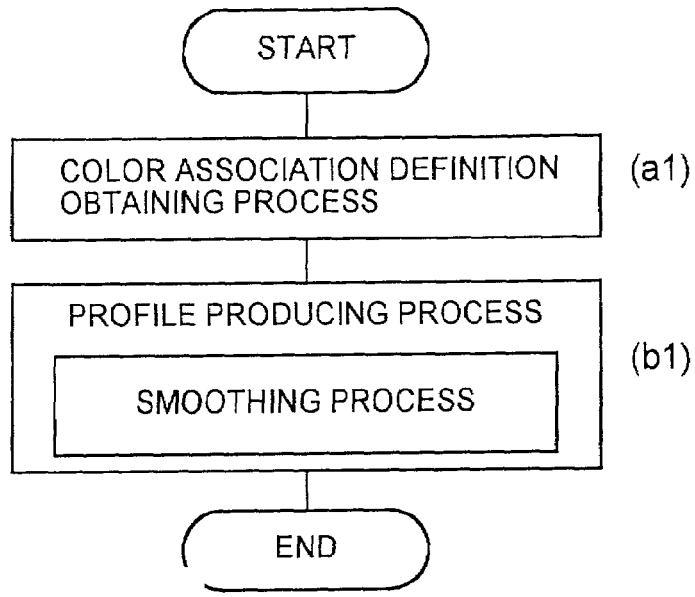
FIG. 7 is a flowchart useful for understanding a procedure of a profile producing method according to the present invention.
FIG. 8 is a view showing data of a color association definition and a profile by way of example.

FIG. 7 is a flowchart useful for understanding a procedure of a profile producing method according to the present invention.

FIG. 7 shows a color association definition obtaining process (step a1) and a profile producing process (step b1). The profile producing process (step b1) contains a smoothing process.

The color association definition obtaining process of the step a1 is a process of obtaining a color association definition defining the association between a first color data (here, color data representative of dot % of CMYK; hereinafter, in some case it happens that the first color data is referred to as CMYK data) representative of coordinates on a device-dependence color space (the RGB space dependent on the color scanner and the CMYK space dependent on the color printer; here, the CMYK space dependent on the color printer, since this is the explanation raising the color printer by way of example), and a second color data (here, color data representative of XYZ values; hereinafter, in some case it happens that the second color data is referred to as XYZ data) representative of coordinates on the common color space (here, the XYZ space).

FIG. 8 is a view showing data of a color association definition and a profile by way of example.

The color association definition defines, as shown in part (A) of FIG. 8, the association between the CMYK data and the XYZ data on coordinate points at rough intervals on the CMYK space, wherein dot % on each of C, M, Y, K roughly varies as 0%, 40%, 70% . . . . On the other hand, the profile defines, as shown in part (B) of FIG. 8, the association between dot % data of CMYK and the XYZ data on coordinate points at relatively fine intervals (10% intervals) on the CMYK color space, wherein dot % on each of C, M, Y, K roughly varies as 0%, 10%, 20%, 30%.

In the color association definition obtaining process (step a1) shown in FIG. 7, for example, there is obtained a color association definition, which is relatively few in data quantity, as shown in part (A) of FIG. 8.

In the profile producing process (step b1) shown in FIG. 7, there is produced a profile, which is relatively much in data quantity, as shown in part (B) of FIG. 8, in accordance with the color association definition obtaining process of the step a1, via a smoothing process of smoothing the second color data (XYZ data) to the first color data (CMYK data). The profile thus produced is subjected to the smoothing process, and defines the association between the first data and the second data after smoothing, so that a profile is produced with great accuracy in which noises destroying monotonicity are suppressed. The smoothing processing will be described later.

Figure 9:
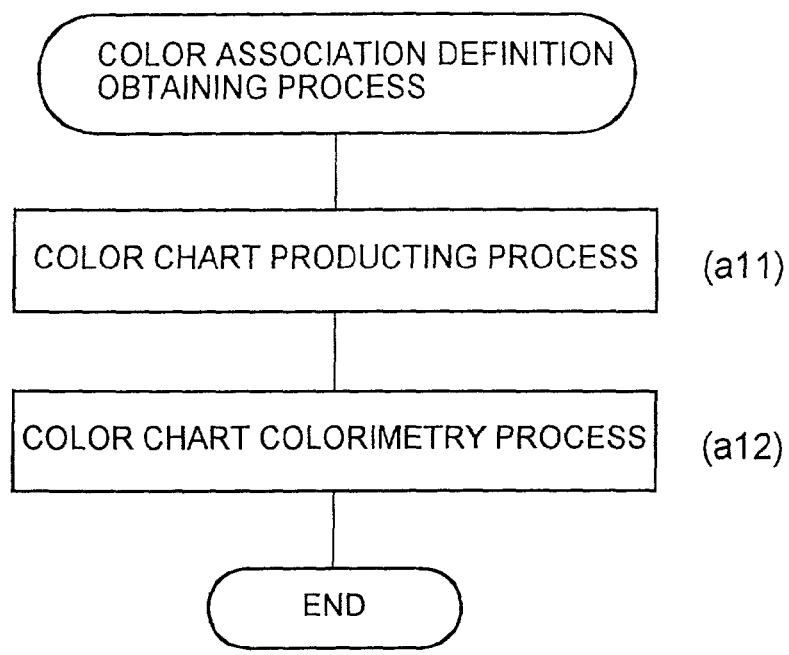
FIG. 9 is a flowchart useful for understanding an example of a color association definition obtaining process of step a1 of FIG. 7.

FIG. 9 is a flowchart useful for understanding an example of a color association definition obtaining process of step a1 of FIG. 7.

The color association definition obtaining process comprises a color chart producing process (step a11) and a color chart colorimetry process (step a12). In the color chart producing process (step a11), the personal computer 20 shown in FIG. 1 generates a plurality of sorts of color data of CMYK to be fed to the color printer 30, so that the color printer 30 outputs a color chart composed of sets of patches associated with color data. In the color chart colorimetry process (step a12), the color patches constituting the color chart outputted from the color printer 30 are measured by a calorimeter to obtain XYZ values of the color patches.

Thus, it is possible to obtain the color association definition as shown in part (A) of FIG. 8 through the color chart producing process (step a11) and the color chart colorimetry process (step a12).

Figure 10:
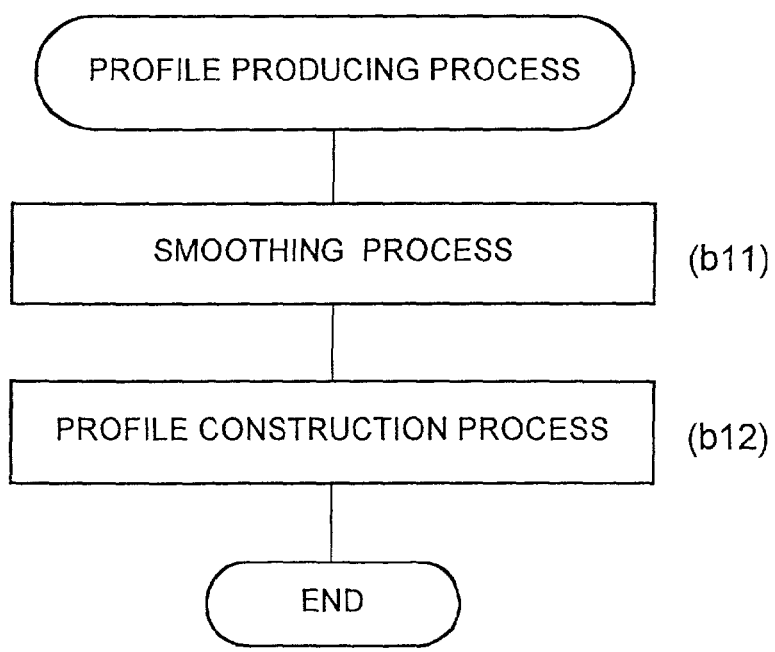
FIG. 10 is a flowchart useful for understanding a first example of a profile producing process of step b1 of FIG. 7.

FIG. 10 is a flowchart useful for understanding a first example of the profile producing process of the step b1 of FIG. 7.

First, a smoothing process (step b11) is placed, and then a profile construction process (step b12) is placed.

In the smoothing process of the step b11, the first color data (CMYK data) constituting the color association definition as shown in part (A) of FIG. 8, which is obtained in the color association definition obtaining process of FIG. 9, and the second color data (XYZ data) are used to smooth the second color data (XYZ data) to the first color data (CMYK data), so that a new color association definition defining the association between the first color data and the smoothed second color data is determined.

Next, in the profile construction process of the step b12, interpolation operations are used to construct a profile in accordance with the new color association definition obtained in the smoothing process of the step b11, the profile consisting of pairs of the first color data and the second color data mutually associated, which are more than the number of pairs (for example, the part (A) of FIG. 8 shows exemplarily three pairs) of the mutually associated first color data and the smoothed second color data, constituting the new color association definition, that is, the profile consisting of a large number of pairs for example, as shown in the part (B) of FIG. 8.

Figure 11:
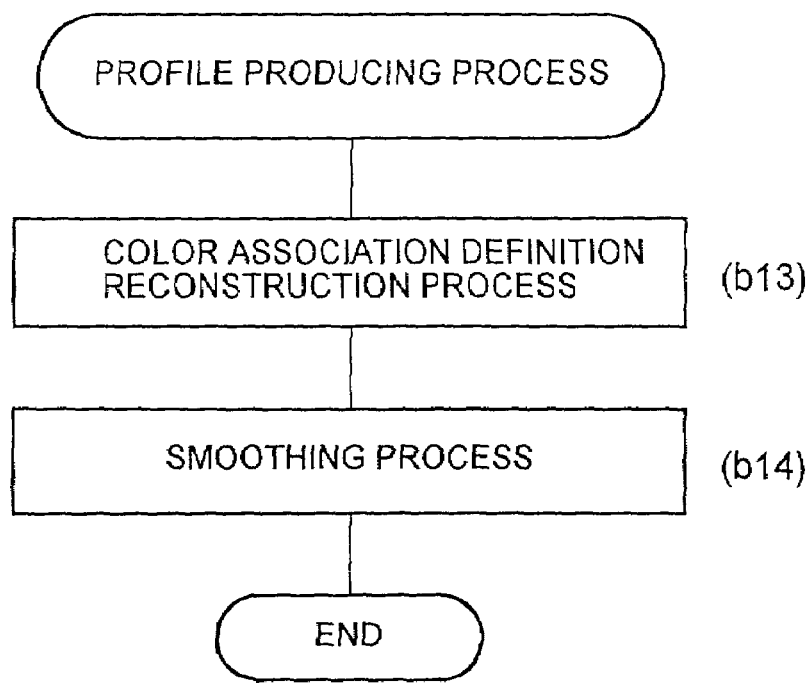
FIG. 11 is a flowchart useful for understanding a second example of a profile producing process of step b1 of FIG. 7.

FIG. 11 is a flowchart useful for understanding a second example of the profile producing process of step b1 of FIG. 7.

First, a color association definition reconstruction process (step b13) is placed, and then a smoothing process (step b14) is placed.

In the color association definition reconstruction process of the step b13, interpolation operations are used to construct a new color association definition in accordance with the color association definition, as shown in the part (A) of FIG. 8, obtained in the color association definition obtaining process of FIG. 9, the new color association definition consisting of pairs of the first color data (CMYK data) and the second color data (XYZ data), which are more than the number of pairs of the mutually associated first color data (CMYK data) and the second color data (XYZ data), constituting the color association definition, and which are equal in number to pairs of the mutually associated first color data (CMYK data) and the second color data (XYZ data), constituting the finally produced profile.

Next, in the smoothing process of the step b14, the first color data constituting the new color association definition, which is obtained in the color association definition reconstruction process of the step b13, and the second color data are used to smooth the second color data to the first color data, so that a profile defining the association between the first color data and the smoothed second color data is produced.

Thus, in the profile processing process, it is acceptable that the color association definition less in data amount as shown in the part (A) of FIG. 8, which is obtained in the color association definition obtaining process (the step a1 in FIG. 7), is first subjected to the smoothing processing, and then an amount of data is increased by the interpolation operation to produce the profile. Or alternatively, it is acceptable that a new color association definition, which is much in an amount of data, is first produced by interpolation operations, from the color association definition less in an amount of data as shown in the part (A) of FIG. 8, and then the new color association definition thus produced is subjected to the smoothing processing to produce the profile.

Figure 12:
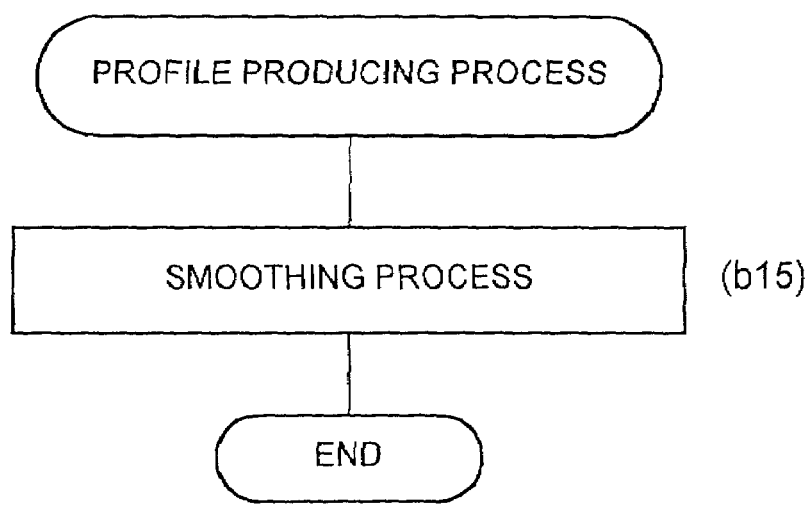
FIG. 12 is a flowchart useful for understanding a third example of a profile producing process of step b1 of FIG. 7.

FIG. 12 is a flowchart useful for understanding a third example of the profile producing process of step b1 of FIG. 7.

In the profile producing process shown in FIG. 12, it is supposed that in the color association definition obtaining process of the step a1 of FIG. 7, the color association definition consisting of pairs of the mutually associated first color data and the second color data, which are equal in number to pairs of the mutually associated first color data and the second color data, constituting the finally produced profile, is obtained. Corresponds to this for example, a case where an existing profile, which has been produced in accordance with the conventional method, is obtained as the color association definition.

In this case, it is sufficient for the profile producing process to simply apply the smoothing process to the obtained color association definition, as shown in FIG. 12.

Figure 13:
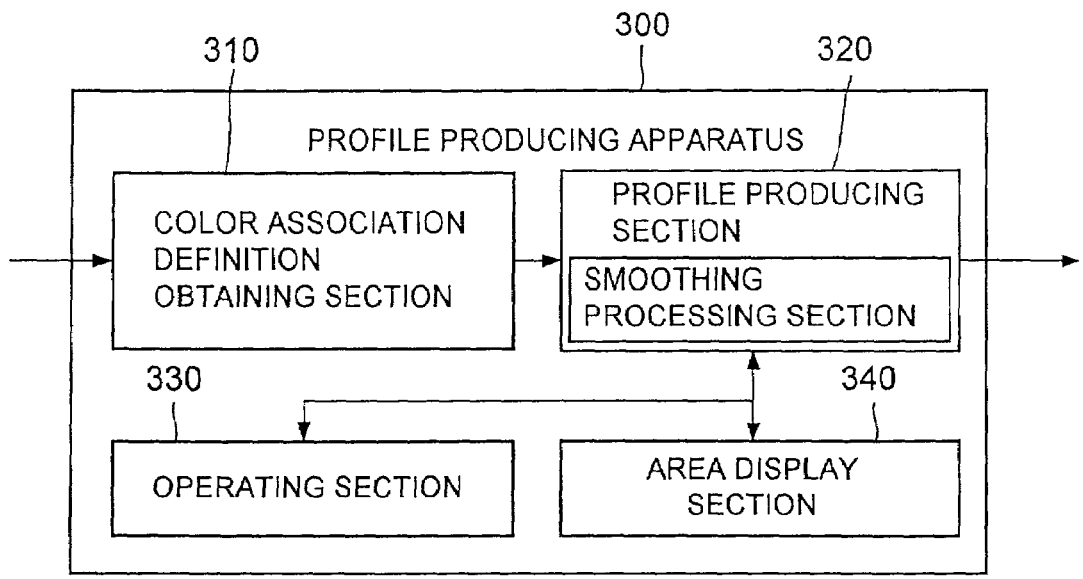
FIG. 13 is a functional block diagram of a profile producing apparatus of the present invention.

FIG. 13 is a functional block diagram of a profile producing apparatus of the present invention.

A profile producing apparatus 300 shown in FIG. 13 is implemented by a combination of a hardware of the personal computer 20 shown in FIGS. 1 to 3, and a software to be executed by the personal computer 20.

The profile producing apparatus 300 shown in FIG. 13 comprises a color association definition obtaining section 310, a profile producing section 320 including a smoothing processing section, an operating section 330, and an area display section 340.

The color association definition obtaining section 310 serves to input a color association definition to the profile producing apparatus 300. When the color association definition is received through a communication, the interface 216 shown in FIG. 3 corresponds to the color association definition obtaining section 310. When the color association definition produced in the manner as mentioned referring to FIG. 9 is inputted by an operator through the keyboard 23 shown in FIG. 2, the keyboard 23 corresponds to the color association definition obtaining section 310. When the color association definition thus produced is stored in the floppy disk 100 (cf. FIG. 3) and the color association definition stored in the floppy disk 100 is inputted to the profile producing apparatus 300 (the personal computer 20), the FD drive 214 shown in FIG. 3 corresponds to the color association definition obtaining section 310.

The profile producing section 320 of the profile producing apparatus 300 shown in FIG. 13 corresponds to a combination of the CPU 211 shown in FIG. 3 and the program including the smoothing processing, for producing the profile, which is executed by the CPU 211.

With respect to the operating section 330, on a hardware basis, the keyboard 23 and the mouse 24 shown in FIGS. 2 and 3 correspond to the operating section 330.

With respect to the area display section 340, on a hardware basis, the image display unit 22 shown in FIGS. 2 and 3 corresponds to the area display section 340.

Figure 14:
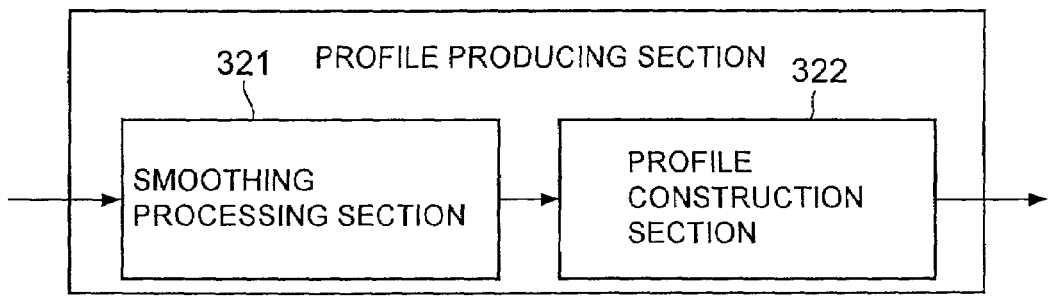
FIG. 14 is a functional block diagram of a first example of a profile producing section.
Figure 15:
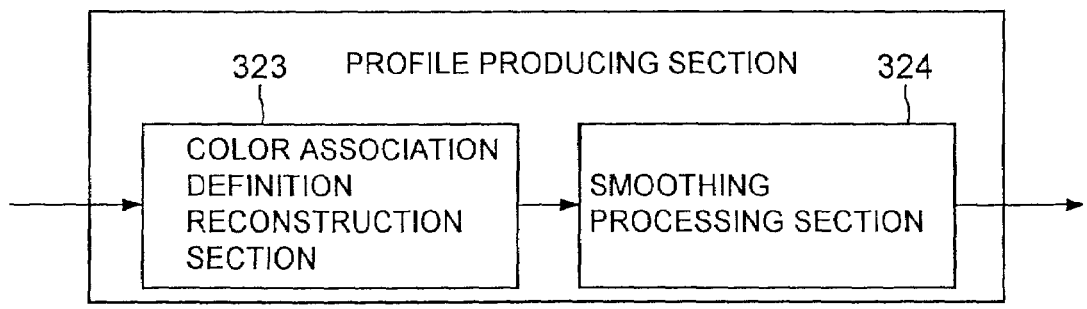
FIG. 15 is a functional block diagram of a second example of a profile producing section.
Figure 16:
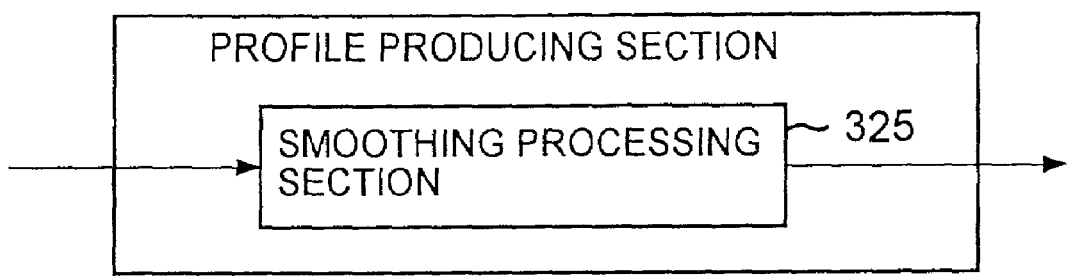
FIG. 16 is a functional block diagram of a third example of a profile producing section.

FIG. 14 is a functional block diagram of a first example of a profile producing section. FIG. 15 is a functional block diagram of a second example of a profile producing section. FIG. 16 is a functional block diagram of a third example of a profile producing section.

The profile producing section shown in FIG. 14 comprises a smoothing processing section 321 and a profile construction section 322. The smoothing processing section 321 performs a processing corresponding to the smoothing process of the step b11 in the profile producing process shown in FIG. 10. The profile construction section 322 performs a processing corresponding to the profile construction process of the step b12 in the profile producing process shown in FIG. 10. Redundant description will be omitted.

The profile producing section shown in FIG. 15 comprises a color association definition reconstruction section 323 and a smoothing processing section 324. In the color association definition reconstruction section 323 and the smoothing processing section 324, processings, which correspond to the color association definition reconstruction process (step b13) and the smoothing process (step b14), respectively, in the profile producing process shown in FIG. 11, are performed. In a similar fashion to that of FIG. 14, redundant description will be omitted.

The profile producing section shown in FIG. 16 comprises only a smoothing processing section 325.

This is given, in a similar to that of the profile producing process shown in FIG. 12, on the assumption that the color association definition, which is the same data scale as the profile finally produced in the color association definition obtaining section 310, is obtained. Redundant description will be omitted.

Figure 17:
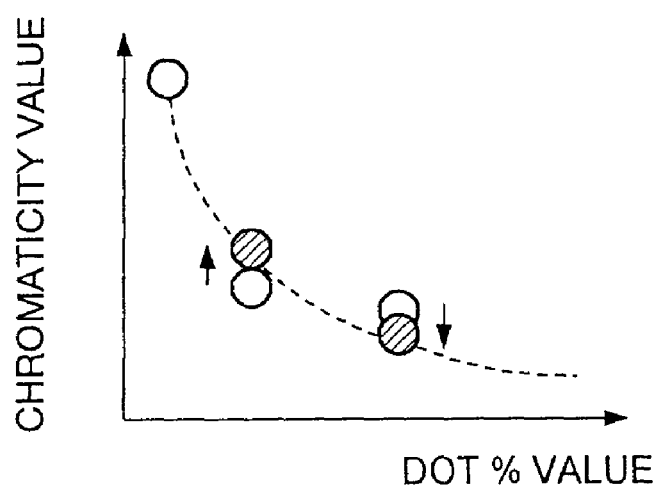
FIG. 17 is a view useful for understanding a first example of a smoothing processing.

FIG. 17 is a view useful for understanding a first example of a smoothing processing. The horizontal axis denotes dot % values of any one of C, M, Y, K, and the vertical axis denotes chromaticity values of any one of XYZ. Here, while only one is typically shown, with respect to combinations of the dot % values of CMYK and the chromaticity values of XYZ, the smoothing processing, which will be described below, is applied thereto.

White circles denote data before the smoothing processing. The data before the smoothing processing are approximated by a polynomial of degree n (for example, degree seven), and as illustrated with circles of hatching, the data are moved on a curve of the polynomial of degree n.

With respect to the smoothing processing, in a similar fashion to that of for example, the smoothing process in the step b11 of FIG. 10 and the smoothing processing in the smoothing processing section 321 of FIG. 14, but different in number of data and in density, it is acceptable that the smoothing processing is carried out before the amount of data is increased by interpolation operations, or alternatively it is acceptable that the smoothing processing is carried out after the amount of data is increased by interpolation operations, as in the smoothing processing in the smoothing process in the step b14 of FIG. 11 and the smoothing processing section 324 of FIG. 15. This is also applicable to other smoothing processing methods which will be described hereinafter.

Figure 18:
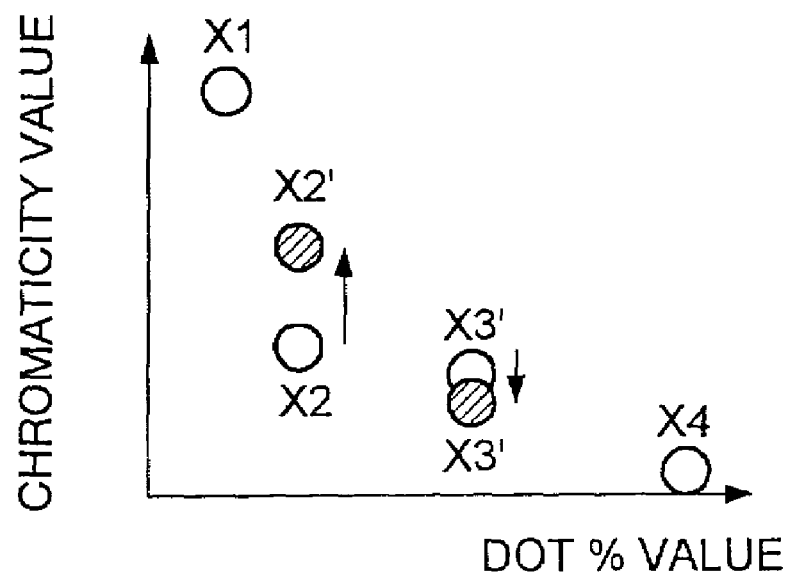
FIG. 18 is a view useful for understanding a second example of a smoothing processing.

FIG. 18 is a view useful for understanding a second example of the smoothing processing. Meaning of the horizontal axis, the vertical axis, the white circles, and the circles of the hatching are same as those of FIG. 17.

Here, there is shown a smoothing processing by a moving average. That is, for example, data X2' and X3' after the smoothing processing are subjected to moving averages as set forth below using data X1, X2, X3, X4 before the smoothing processing.

$$X2'=(X1+X2+X3)/3$$

$$X3'=(X2+X3+X4)/3$$

And the smoothing processing is carried out. Alternatively, it is acceptable that W1, W2 and W3 are adopted as weight, and a weighted moving average is performed in accordance with the following formulas.

$$X2'=(W1 \times X1+W2 \times X2+W3 \times X3)/(W1+W2+W3)$$

$$X3'=(W1 \times X2+W2 \times X3+W3 \times X4)/(W1+W2+W3)$$

Figure 19:
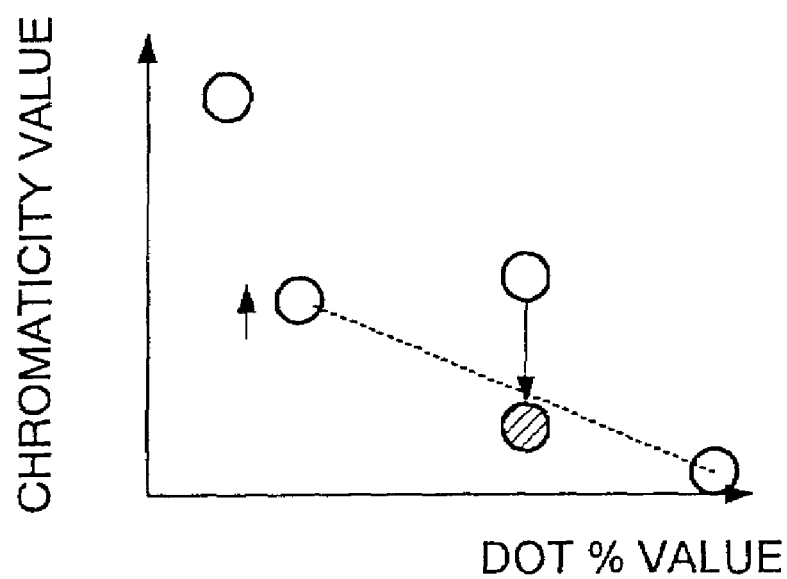
FIG. 19 is a view useful for understanding a third example of a smoothing processing.

FIG. 19 is a view useful for understanding a third example of the smoothing processing.

Meaning of the horizontal axis and the vertical axis is the same as those of FIGS. 17 and 18.

Here, points contrary to a monotonicity of a variation of chromaticity values to a variation of dot % values are individually moved to positions wherein the monotonicity is satisfied. It is acceptable that the smoothing is performed in accordance with the manner as mentioned above.

Figure 20:
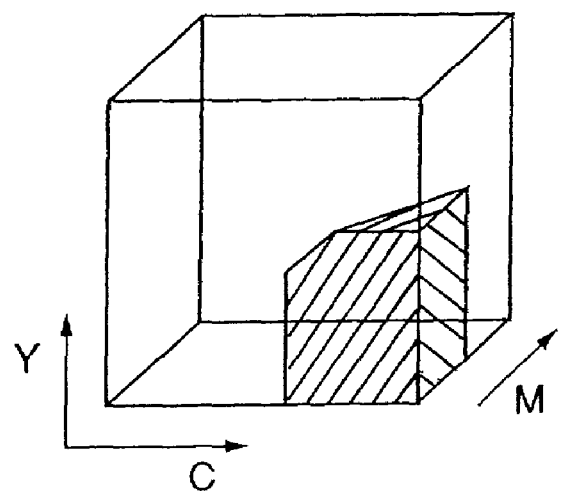
FIG. 20 is a view showing a CMY space where K=0.

FIG. 20 is a view showing a CMY space where K=0. Hatching is applied to a partial area of the whole area of a cube wherein dot % values of C, M, Y are 0% to 100%. Here, it means that the smoothing processing, which is explained referring to FIGS. 17 to 19, is carried out with respect to only the partial area of hatching. In this manner, the restriction of the smoothing processing to be carried out to the partial area makes it possible to reduce a computation time. Further, avoiding of a smoothing processing for an area other than an area for which the smoothing processing is needed makes it possible to avoid such a matter that an accuracy is partially degraded owing to the unnecessary smoothing processing.

Figure 21:
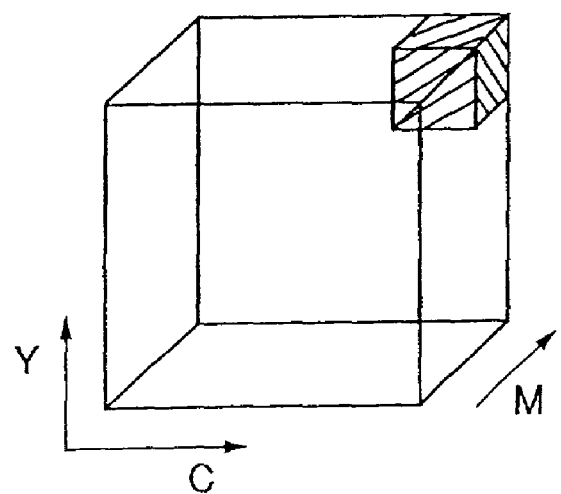
FIG. 21 is a view showing a CMY space where K=0.

FIG. 21 is a view showing a CMY space where K=0, similar to FIG. 20. It means that the smoothing processing is carried out with respect to only a partial area of the high density side of hatching, of an area of a cube wherein dot % values of C, M, Y are 0% to 100%.

A noise is easy to be mixed into the high density area at the time of colorimetry. Accordingly, an application of the smoothing processing to only the high density area makes it possible to expect not only a merit of a reduction of the computation time explained referring to FIG. 20, but also an effective suppression of a large noise on the area to which the noise is easily mixed.

Figures 22, 23:
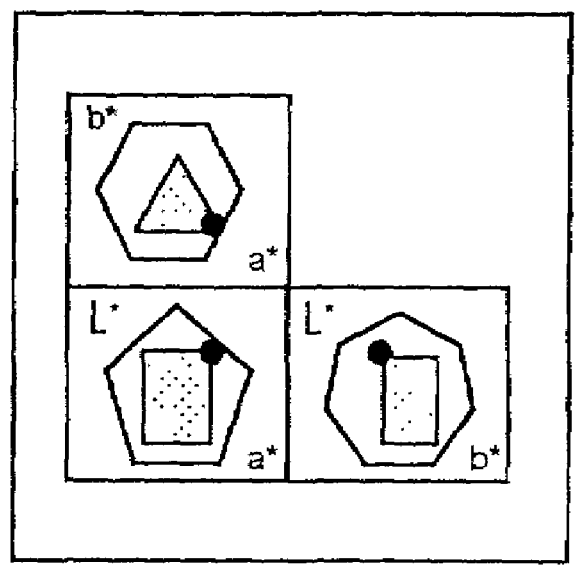
FIG. 22 is a view showing a first example of a display screen displayed on an area display section of the profile producing apparatus showing in FIG. 13.
FIG. 23 is a view showing a second example of a display screen displayed on an area display section of the profile producing apparatus showing in FIG. 13.

FIG. 22 is a view showing a first example of the display screen displayed on the area display section 340 (on the hardware, the image display unit 22) of the profile producing apparatus showing in FIG. 13.

FIG. 22 shows a smoothing range designation screen. An operator operates the keyboard 23 shown in FIG. 2 to enter the respective ranges (% to %) for C, M, Y, K into the frames on the screen. The profile producing section 320 performs the smoothing processing for the designated partial area according to such an entry.

FIG. 23 is a view showing a second example of a display screen displayed on the area display section 340 of the profile producing apparatus showing in FIG. 13.

FIG. 23 shows a*-b* plane, a*-L* plane and b*-L* plane in L*a*b* space. An operator operates the mouse 24 shown in FIG. 2 (in FIG. 23, the mouse cursor is shown with a circle) to graphically designate a partial area in L*a* b* space. Thus, when the partial area is designated, in a similar to that of the numerical value designation in FIG. 22, the profile producing section 320 shown in FIG. 13 performs the smoothing processing for the designated partial area.

In this manner, it is acceptable that an operator designates a partial area to be subjected to the smoothing processing through a man-machine interface.

Figure 24:
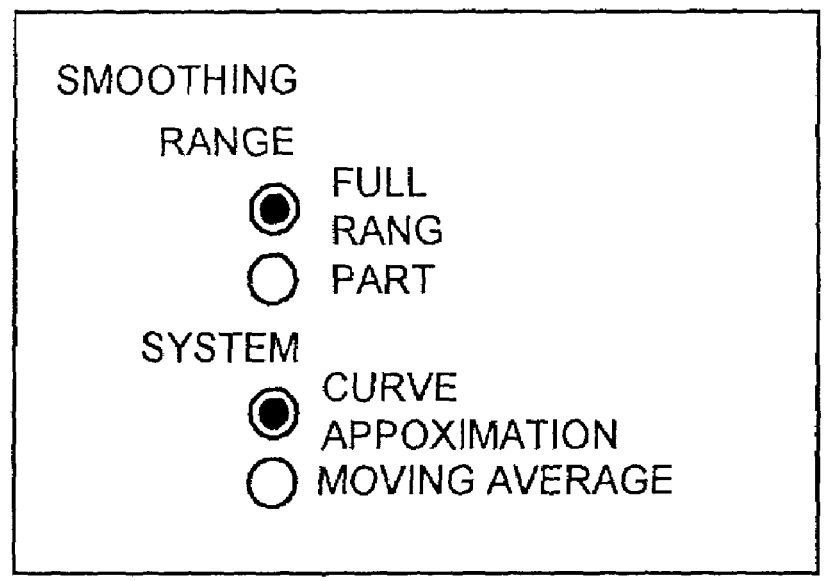
FIG. 24 is a view showing a third example of a display screen displayed on an area display section of the profile producing apparatus showing in FIG. 13.

FIG. 24 is a view showing a third example of a display screen displayed on the area display section 340 of the profile producing apparatus showing in FIG. 13.

FIG. 24 shows a screen in which a range of the smoothing and a system of the smoothing are selected. An operator operates the mouse shown in FIG. 2 to select the range of the smoothing and the system of the smoothing. The selection of the range of the smoothing and the system of the smoothing by the operator make it possible to freely select the smoothing processing taking into consideration the computation time and the accuracy.

Figure 25:
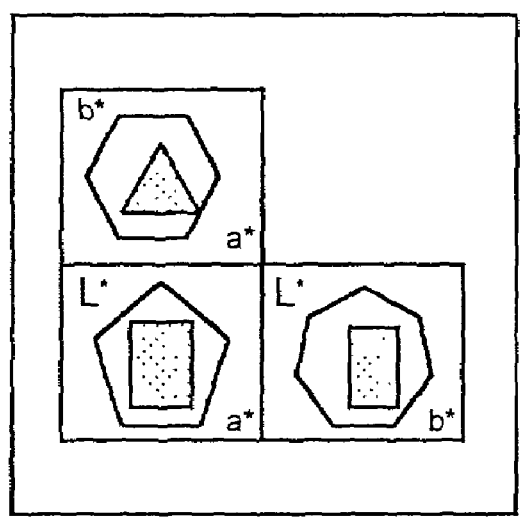
FIG. 25 is a view showing a fourth example of a display screen displayed on an area display section of the profile producing apparatus showing in FIG. 13.

FIG. 25 is a view showing a fourth example of a display screen displayed on the area display section 340 of the profile producing apparatus showing in FIG. 13.

FIG. 25 shows, in a similar fashion to that of FIG. 23, partial areas on a*-b* plane, a*-L* plane and b*-L* plane in L*a*b* space.

The partial areas here indicated are not areas designated by an operator, but are areas displayed in such a manner that a profile producing apparatus automatically determines areas necessary for the smoothing. As the base of the automatic determination of the areas necessary for the smoothing, in the profile producing apparatus, for example, it is acceptable that an operator enters for example a name and a type of the color printer 30 (cf. FIG. 1) which is intended to be used for producing a profile, and such information is used. It is possible some color printer to have areas necessary for the smoothing according to its "habit" beforehand in form of a table. When information such as types of the printer which is intended to be used for producing a profile is inputted, areas necessary for the smoothing are displayed referring to the table.

Alternatively, by way of another example, it is acceptable that as a color chart to be outputted by a color printer, there is used a color chart in which a plurality of color patches based on the same color data are disposed on a distribution basis, a variation width of colorimetry values of the color patches produced based on the same color data, constituting the color chart, is checked, an area which is large in the variation width is detected, and such an area is displayed as an area for which the smoothing is necessary.

An arrangement wherein an area for which the smoothing is necessary is automatically determined and displayed in the apparatus side in the manner as mentioned above makes it possible for an operator to easily grasp as to what area is to be subjected to the smoothing.

It is acceptable that such an automatic display and the mouse operation by an operator explained referring to FIG. 23 are used together so that the operator can change an area automatically displayed once. Incidentally, according to the above-mentioned embodiments, there is explained the smoothing of a profile of the color printer (the output device) by way of example. However, it is acceptable that also in producing an input profile, the same smoothing is carried out so that the input profile is produced with great accuracy.

As mentioned above, according to the present invention, the smoothing makes it possible to produce a profile with great accuracy suppressing noises destroying monotonicity.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A profile producing method of producing a profile representative of an association between a first color data representative of coordinates on a device-dependence color space dependent on a device mediating between image data including color data and a color image, and a second color data representative coordinates on a common color space independent of devices, said profile producing method comprising:

a color association definition obtaining step of obtaining a color a definition defining an association between the first color data representative of coordinates on the device-dependence color space and the second color data representative of coordinates on the common color space; and a profile producing step of producing a profile defining an association between the first color data representative of coordinates on the device-dependence color space and smoothed second color data representative of coordinates on the common color space, in accordance with the color association definition obtained in said color association definition obtaining step, via a smoothing step of smoothing the second color data representative of coordinates on the common color space to the first color data representative of coordinates on the device-dependence color space, wherein the smoothing step further comprising:

using the horizontal axis to denote dot % values of a first color data;

using the vertical axis to denote chromaticity values of a second color data;

obtaining a curve approximating data before the smoothing step; and moving the data before the smoothing step on the curve.

2. A profile producing method of producing a profile representative of an association between first color data representative of coordinates on a device-dependence color space dependent on a device mediating between image data including color data and a color image, and a second color data representative of coordinates on a common color space independent of devices, said profile producing method comprising:

a color association definition obtaining step of obtaining a color a definition defining an association between the first color data representative of coordinates on the device-dependence color space and the second color data representative of coordinates on the common color space; and a profile producing step of producing a profile defining an association between the first color data representative of coordinates on the device-dependence color space and smoothed second color data representative of coordinates on the common color space, in accordance with the color association definition obtained in said color association definition obtaining step, via a smoothing step of smoothing the second color data representative of coordinates on the common color space to the first color data representative of coordinates on the device-dependence color space, wherein the smoothing step further comprising:

using the horizontal axis to denote dot % values of a first color data;

using the vertical axis to denote chromaticity values of a second color data;

obtaining a least two data before the smoothing step; and obtaining an average of the at least two data before the smoothing step.

3. A profile producing apparatus for producing a profile representative of an association between a first color data representative of coordinates on a device-dependence color space dependent on a device mediating between image data including color data and a color image, and a second color data representative of coordinates on a common color space independent of devices, and profile producing apparatus comprising:

a color association definition obtaining section for obtaining a color association definition defining an association between the first color data representative of coordinates on the device-dependence color space and the second color data representative of coordinates on the common color space; and a profile producing section for producing a profile defining an association between the first color data representative of coordinates of the device-dependence color space and smoothed second color data representative of coordinates on the common color space, in accordance with the color association definition obtained in said color association definition obtaining section, said profile producing section including a smoothing processing section for smoothing the second color data representative of coordinates on the common color space to the first color data representative of coordinates on the device-dependence color space, wherein the smoothing processing section further comprising:

means for using the horizontal axis to denote dot % values of a first color data;

means for using the vertical axis to denote chromaticity values of a second color data;

means for obtaining a curve approximating data before smoothing; and means for moving the data before smoothing on the curve.

4. A profile producing apparatus for producing a profile representative of an association between a first color data representative of coordinates on a device-dependence color space dependent on a device mediating between image data including color data and a color image, and a second color data representative of coordinates on a common color space independent of devices, said profile producing apparatus comprising:

a color association definition obtaining section for obtaining a color association definition defining an association between the first color data representative of coordinates on the device-dependence color space and the second color data representative of coordinates on the common color space; and a profile producing section for producing a profile defining an association between the first color data representative of coordinates on the device-dependence color space and smoothed second color data representative of coordinates on the common color space, in accordance with the color association definition obtained in said color association definition obtaining section, said profile producing section including a smoothing processing section for smoothing the second color data representative of coordinates on the common color space to the first color data representative of coordinates on the device-dependence color space, wherein the smoothing processing section further comprising:

means for using the horizatal axis to denote dot % values of a first color data;

means for using the vertical axis to denote chromaticity values of a second color data;

means for obtaining at least two data before smoothing; and means for obtaining an average of the at least two data before smoothing.

* * * * *